(12) United States Patent
Ahn et al.

(10) Patent No.: US 10,697,529 B1
(45) Date of Patent: Jun. 30, 2020

(54) APPARATUS FOR TORQUE VECTORING

(71) Applicants: Hyundai Motor Company, Seoul (KR); Kia Motors Corporation, Seoul (KR)

(72) Inventors: Chulmin Ahn, Suwon-si (KR); SungGon Byun, Hwaseong-si (KR); Seok Joon Kim, Yongin-si (KR); Su Hyeon Maeng, Seoul (KR); Hongkyu Lee, Yongin-si (KR); Baekyu Kim, Hwaseong-si (KR); Junyoung Ha, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/369,842

(22) Filed: Mar. 29, 2019

(30) Foreign Application Priority Data

Dec. 5, 2018 (KR) .......................... 10-2018-0155484

(51) Int. Cl.
*F16H 48/36* (2012.01)
*F16H 3/72* (2006.01)

(52) U.S. Cl.
CPC .............. *F16H 48/36* (2013.01); *F16H 3/725* (2013.01); *F16H 2048/364* (2013.01); *F16H 2048/368* (2013.01)

(58) Field of Classification Search
CPC .......... F16H 3/725; F16H 48/06; F16H 48/36; F16H 2048/343; F16H 2048/364; F16H 2048/368; F16H 2200/2012; F16H 2200/2015
See application file for complete search history.

(56) References Cited

U.S. PATENT DOCUMENTS

| | | | |
|---|---|---|---|
| 5,518,463 A | 5/1996 | Shibahata et al. | |
| 2006/0172847 A1* | 8/2006 | Gradu | F16H 48/10 475/230 |
| 2013/0281247 A1* | 10/2013 | Holmes | B60K 6/52 475/150 |
| 2016/0003337 A1* | 1/2016 | Smetana | B60K 6/365 475/5 |
| 2018/0304744 A1* | 10/2018 | Wang | B60K 6/445 |

* cited by examiner

*Primary Examiner* — Edwin A Young
(74) *Attorney, Agent, or Firm* — Morgan, Lewis & Bockius LLP

(57) ABSTRACT

A drive torque received from a power source is split and output to first and second output shafts through a torque vectoring apparatus including a torque vectoring device that controls a torque ratio of split torques, where the torque vectoring device includes a control motor, a first compound planetary gear set including first and second planetary gear sets having a first rotation element fixed to a housing, a shared second rotation element connected to the first output shaft, and a third rotation element, and a second compound planetary gear set including third and fourth planetary gear sets having a shared fourth rotation element connected to the second output shaft, a fifth rotation element connected to a third rotation element, and a sixth rotation element connected to the control motor.

9 Claims, 2 Drawing Sheets

APPARATUS FOR TORQUE VECTORING

CROSS-REFERENCE TO RELATED APPLICATION

The present application claims priority to Korean Patent Application No. 10-2018-0155484 filed on Dec. 5, 2018, the entire contents of which is incorporated herein for all purposes by this reference.

BACKGROUND OF THE INVENTION

Field of the Invention

The present invention relates to a torque vectoring apparatus.

Description of Related Art

In general, a torque vectoring apparatus is a device that can independently control torques transmitted to left-side and right-side drive wheels to improve agility and handing performance of a vehicle.

Here, the term "torque vectoring" refers to controlling the magnitude and the direction of an overall torque applied to a vehicle, of which an example is that a distribution ratio of a driving torque output from an engine and supplied to drive wheels is controlled, facilitating respective driving wheels to receive driving torques controlled by the torque vectoring technology.

Such a torque vectoring may be realized as an additional function of a differential device that receives an engine torque and distributes the engine torque to left-side and right-side drive wheels.

A differential device provided with the torque vectoring function may actively control a torque distribution ratio of left-side and right-side drive wheels to satisfy intention of a driver or to enhance dynamics of a vehicle depending on driving circumstances.

Being assisted by such a differential device having the torque vectoring function, a driver may better utilize the driving torque depending on the driving circumstances and an enhancement of vehicle dynamics may be expected.

Developing a differential device having such a torque vectoring function is not technically obvious, since the torque vectoring function of controlling torques supplied to respective wheels may be additionally employed to the basic function of a differential device.

Development of a torque vectoring apparatus is gathering more spotlight in connection with an electric vehicle since the electric vehicle is better applicable with such a torque vectoring apparatus more precisely in comparison with a traditional internal combustion engine (ICE) vehicle. As environmental vehicles become to have more power and performance, a torque vectoring apparatus is more spotlighted as a technology applicable to a rear differential device of, e.g., an all wheel drive (AWD) electric vehicles (EV) to improve cornering performance of high performance environmental vehicles.

An exemplary environmental vehicle of the AWD electric vehicle is not necessarily required to have a transfer shaft which is normally required in an ICE vehicle to deliver torque from a frontally disposed internal combustion engine to a rear drive wheels, since AWD function may be achieved by merely employing two motor system, i.e., front and rear motors.

Regardless of one motor or two motor system or 2wd or AWD system, a torque of an electric motor provided in an electric vehicle is typically more precisely controlled in comparison with an ICE, and thus, a torque vectoring apparatus coupled with such a drive motor may become a very potential tool to provide more agility and more stability to a vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a torque vectoring apparatus facilitating better performance and less torque loss.

An exemplary torque vectoring apparatus according to an exemplary embodiment of the present invention receives a vehicle driving torque from a motor/generator, and may include a speed reduction device reducing a rotation speed received from the motor/generator, a differential device receiving the reduced rotation speed from the speed reduction device and differentially outputting split torques to left-side and right-side output shafts, and a torque vectoring device controlling a torque ratio of the split torques output to the left-side and right-side output shafts. The torque vectoring device may include a torque vectoring control motor, a first compound planetary gear set including first and second planetary gear sets, and a second compound planetary gear set including third and fourth planetary gear sets.

The first planetary gear set may include first and second rotation elements. The second planetary gear set shares the second rotation element with the first planetary gear set and may further include a third rotation element. The first rotation element is fixed to a housing. The second rotation element is fixedly connected to a first output shaft among the left-side and right-side output shafts through the differential device.

The third planetary gear set may include fourth and fifth rotation elements. The fourth planetary gear set shares the fourth rotation element with the third planetary gear set and may further include a sixth rotation element. The fourth rotation element fixedly connected to a second output shaft among the left-side and right-side output shafts. The fifth rotation element is fixedly connected to the second rotation element. The sixth rotation element is gear-meshed with the torque vectoring control motor.

An output gear formed at a motor shaft of the torque vectoring control motor may be externally gear-meshed with an input gear fixedly connected to the sixth rotation element.

The torque vectoring control motor may be formed as a motor of which rotation speed and rotating direction are controllable.

The first, second, and third rotation elements of the first compound planetary gear set may be formed by a first sun gear of the first planetary gear set, a first common planet carrier shared by the first and second planetary gear sets, and a second ring gear of the second planetary gear set, respectively.

The fourth, fifth, and sixth rotation elements of the second compound planetary gear set may be formed by a second common planet carrier shared by the third and fourth planetary gear sets, a third ring gear of the third planetary gear set, and a fourth sun gear of the fourth planetary gear set, respectively.

The differential device may include a fifth planetary gear set having seventh, eighth, and ninth rotation elements. The seventh rotation element may be fixedly connected to the second output shaft fixedly connected to the fourth rotation element. The eighth rotation element may be fixedly connected to the first output shaft. The ninth rotation element may receive the reduced rotation speed from the speed reduction device.

The fifth planetary gear set may be a double pinion planetary gear set having a fifth sun gear, a fifth planet carrier, and a fifth ring gear respectively as the seventh, eighth, and ninth rotation elements.

The speed reduction device may include a drive gear connected to a rotor of the motor/generator, a driven gear formed on an external circumference of the ninth rotation element of the differential device, and an idle gear unit reducing an input speed received from the drive gear and outputting the reduced rotation speed through the driven gear.

The idle gear unit may include an idle shaft disposed radially external to the differential device and in parallel with the left-side and right-side output shafts, an idle input gear rotatably mounted on the idle shaft and externally gear-meshed with the drive gear, and an idle output gear fixedly formed on the idle shaft and externally gear-meshed with the driven gear.

The idle gear unit may further include a synchronizer disposed between the idle input gear and the idle shaft, and selectively synchronizing the idle input gear to the idle shaft.

A torque vectoring apparatus according to an exemplary embodiment of the present invention is applicable to a high performance environmental vehicle provided with a one-motor e-AWD (all wheel drive), and may achieve both cornering performance and stability of a vehicle depending on driving conditions.

Furthermore, when a vehicle speed becomes excessive to the motor/generator MG, torque transmission from and to the motor/generator MG may be disconnected, reducing undesired power loss and improving fuel consumption.

Such a torque disconnection function may be applicable to a hybrid electric vehicle (HEV), a plug-in hybrid electric vehicle (PHEV), and may be useful in disconnecting torque of a drive motor in the case of running an internal combustion engine.

By employing a torque vectoring control motor TVCM in a torque vectoring device, a torque vectoring function may be optimally controlled, and power loss may be minimized, improving fuel consumption characteristic. By symmetrically forming two compound planetary gear sets in the torque vectoring device, power loss of a torque vectoring apparatus may be minimized and controllability of the torque vectoring apparatus is maximized, since the torque vectoring control motor TVCM may be merely stationary in a straight line.

Other effects which may be obtained or are predicted by an exemplary embodiment of the present invention will be explicitly or implicitly described in a detailed description of the present invention. That is, various effects that are predicted according to an exemplary embodiment of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
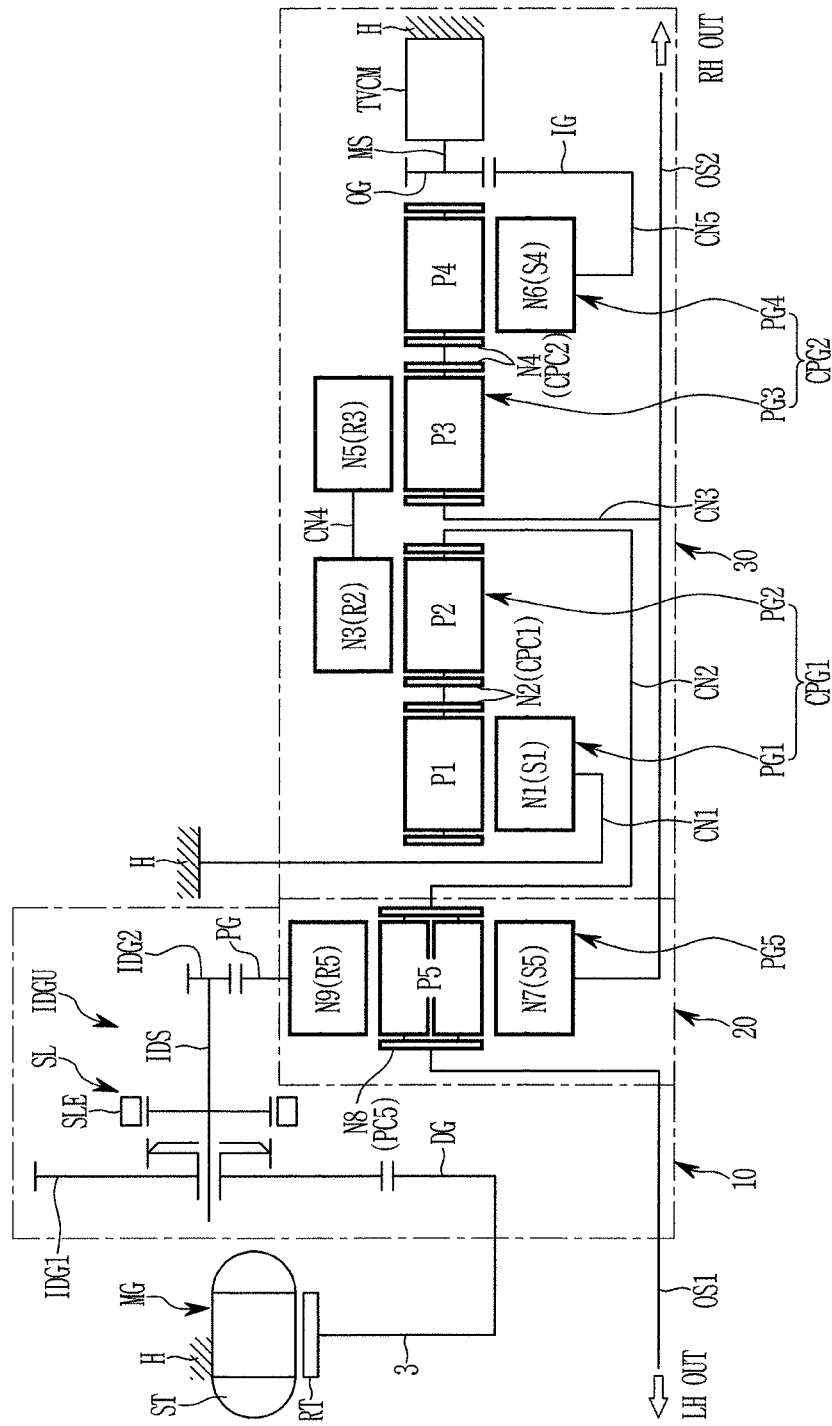
FIG. 1 is a schematic diagram of a torque vectoring apparatus according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic diagram of a torque vectoring apparatus according to an exemplary embodiment of the present invention.

Referring to FIG. 1, a torque vectoring apparatus according to an exemplary embodiment of the present invention includes a motor/generator MG as a driving power source, a speed reduction device 10, a differential device 20, and a torque vectoring device 30. The differential device 20 and the torque vectoring device 30 are disposed on an axis of left-side and right-side output shafts OS1 and OS2.

In the torque vectoring apparatus, a rotation speed of the motor/generator MG is reduced in the speed reduction device 10, and the reduced rotation speed is transmitted to the differential device 20. The differential device 20 receives a torque from the speed reduction device 10 to and transmits the received torque to left-side and right-side drive wheels while absorbing a speed difference between the left-side and right-side drive wheels.

The torque vectoring device 30 adjusts a torque ratio split to the left-side and right-side drive wheels according to driving conditions such as turning or driving in a straight line, and thereby improves driving performance such as a cornering turning performance and the like of a vehicle.

The left-side and right-side output shafts OS1 and OS2 are power transmission shafts provided between the differential device 20 and the left-side and right-side drive wheels, and may imply typical left-side and right driveshafts.

The motor/generator MG includes a stator ST fixed to a housing H and a rotor RT connected to the speed reduction device 10. The motor/generator MG acts as a motor supplying rotational power to the speed reduction device 10, and also as a generator generating electricity by the torque applied from the left-side and right-side drive wheels.

The speed reduction device 10 receives a torque from the motor/generator MG, and outputs a torque with a reduced rotation speed (i.e., with an increased torque) to the differential device 20.

The speed reduction device 10 includes a drive gear DG, a driven gear PG, and an idle gear unit IDGU. The torque of the motor/generator MG is input to the speed reduction device 10 through the drive gear DG, and is reduced at the idle gear unit IDGU. The reduced torque is output from speed reduction device 10 through the driven gear PG, and is transmitted to the differential device 20.

The drive gear DG is fixedly connected to the rotor RT of the motor/generator MG through a hub 3.

The driven gear PG is formed on one rotation element of the differential device 20 and enables torque transmission between the speed reduction device 10 and the differential device 20.

The idle gear unit IDGU reduces the rotation speed through two idle gears mounted on an idle shaft IDS.

That is, the idle shaft IDS is disposed radially external to the differential device 20, and in parallel with the left-side and right-side output shafts OS1 and OS2.

Two idle gears are formed on the idle shaft IDS and may include an idle input gear IDG1 and an idle output gear IDG2.

The idle input gear IDG1 is rotatably mounted on the idle shaft IDS and is externally gear-meshed with the drive gear DG.

The idle output gear IDG2 is fixedly formed on the idle shaft IDS and is externally gear-meshed with the driven gear PG.

The idle gear unit IDGU further includes a synchronizer SL on the idle shaft IDS, to selectively synchronize the idle input gear IDG1 with the idle shaft IDS, to connect or disconnect torque transmission between the motor/generator MG and the differential device 20.

The synchronizer SL is disposed between the idle input gear IDG1 and the idle shaft IDS, and selectively synchronizes the idle input gear IDG1 to the idle shaft IDS.

The synchronizer SL may be formed in a known scheme, which will be obviously understood without a further detailed description, and a sleeve SLE included in the synchronizer SL may be activated by an additional actuator controlled by a control unit.

The differential device 20 receives a torque from the speed reduction device 10, and distributes the received torque to the left-side and right-side output shafts OS1 and OS2, while allowing a rotation speed difference between the left and the right-side drive wheels.

The differential device 20 includes a fifth planetary gear set PG5 that includes seventh, eighth, and ninth rotation elements N7, N8, and N9.

The fifth planetary gear set PG5 is a double pinion planetary gear set, and includes a fifth sun gear S5, a fifth planet carrier PC5 rotatably supporting a plurality of fifth pinion gears P5 externally gear-meshed with the fifth sun gear S5, and a fifth ring gear R5 internally gear-meshed with the plurality of fifth pinion gears P3. The fifth sun gear S5 acts as a seventh rotation element N7, the fifth planet carrier PC5 acts as an eighth rotation element N8, and the fifth ring gear R5 acts as a ninth rotation element N9.

The seventh rotation element N7 is fixedly connected to the right-side output shaft OS2 and the eighth rotation element N8 is fixedly connected to the left-side output shaft OS1. The ninth rotation element N9 is fixedly connected to the driven gear PG of the speed reduction device 10, as described above.

It may be understood that the driven gear PG may be integrally formed at an external circumference of the fifth ring gear R5, i.e., the ninth rotation element N9.

The torque vectoring device 30 adjusts a torque ratio between the left-side and right-side drive wheels, and includes a torque vectoring control motor TVCM and two compound planetary gear sets CPG1 and CPG2.

The torque vectoring control motor TVCM, of which rotation speed and rotating direction are controllable, is fixed to the housing H, and an output gear OG is formed at a motor shaft MS of the torque vectoring control motor TVCM.

The two compound planetary gear sets CPG1 and CPG2 are symmetrically disposed side by side. Each of the two compound planetary gear sets CPG1 and CPG2 is formed as two planetary gear sets sharing a common planet carrier.

First compound planetary gear set CPG1 includes first and second planetary gear sets PG1 and PG2 sharing a second rotation element N2, i.e., a first common planet carrier.

The first planetary gear set PG1 is a single pinion planetary gear set, and includes a first sun gear S1 and a first common planet carrier CPC1 rotatably supporting a plurality of first pinion gears P1 externally engaged with the first sun gear S1, without including a ring gear. The first sun gear S1 acts a first rotation element N1, and the first common planet carrier CPC1 acts as a second rotation element N2.

The second planetary gear set PG2 is a single pinion planetary gear set, and includes the first common planet carrier CPC1 rotatably supporting a plurality of second pinion gears P2 and a second ring gear R2 internally engaged with the plurality of second pinion gears P2, without including a sun gear. The first common planet carrier CPC1 acts as the second rotation element N2, and the second ring gear R2 acts a third rotation element N3.

Here, the first rotation element N1 is fixedly connected to the housing H through a first connecting member CN1, and the second rotation element N2 is fixedly connected to the eighth rotation element N8 of the fifth planetary gear set PG5 through a second connecting member CN2 to communicate torque with the differential device 20.

Second compound planetary gear set CPG2 includes third and fourth planetary gear sets PG3 and PG4 sharing a fourth rotation element N4, i.e., a second common planet carrier PC2.

The third planetary gear set PG3 is a single pinion planetary gear set, and includes a second common planet carrier CPC2 rotatably supporting a plurality of third pinion gears P3 and a third ring gear R3 internally engaged with the plurality of third pinion gears P3, without including a sun gear. The second common planet carrier CPC2 acts as a fourth rotation element N4, and the third ring gear R3 acts a fifth rotation element N5.

The fourth planetary gear set PG4 is a single pinion planetary gear set, and includes a fourth sun gear S4 and the second common planet carrier CPC2 rotatably supporting a plurality of fourth pinion gears P4 externally engaged with the fourth sun gear S4, without including a rung gear. The fourth ring gear R4 acts a sixth rotation element N6, and the second common planet carrier CPC2 acts as the fourth rotation element N4.

Here, the fourth rotation element N4 is fixedly connected to the right-side output shaft OS2 through a third connecting member CN3, and the fifth rotation element N5 is fixedly connected to the third rotation element N3 through a fourth connecting member CN4.

An input gear IG is fixedly connected to the sixth rotation element N6 through a fifth connecting member CN5, and the input gear IG is externally gear-meshed with the output gear OG of the torque vectoring control motor TVCM.

Gear ratios of the first and second planetary gear sets PG1 and PG2 may be set symmetrically the same as gear ratios of the third and fourth planetary gear sets PG3 and PG4. In more detail, the gear ratio of the first planetary gear set PG1 may be set the same as the gear ratio of the fourth planetary gear set PG4, and the gear ratio of the second planetary gear set PG2 may be set the same as the gear ratio of the third planetary gear set PG3.

Each of the five connecting members CN1 to CN5 may be a rotation member which is fixedly connected to a rotation element of the planetary gear sets PG1, PG2, PG3, PG4, and PG5, or may be a rotation member that selectively interconnects a rotation element to the transmission housing H, or may be a fixed member fixed to the transmission housing H.

In the disclosure, when two or more members are described to be "fixedly connected", where each of the members may be any of a connecting member, left-side and right-side output shafts OS1 and OS2, a rotation member, and a transmission housing, it means that the fixedly connected members always rotate at a same speed.

Such a schemed torque vectoring device 30 realizes a torque vectoring are configured to torques transmitted to the left-side and right-side drive wheels as shown in FIG. 2, depending on rotation speed and rotating direction of the torque vectoring control motor TVCM.

Figure 2A:
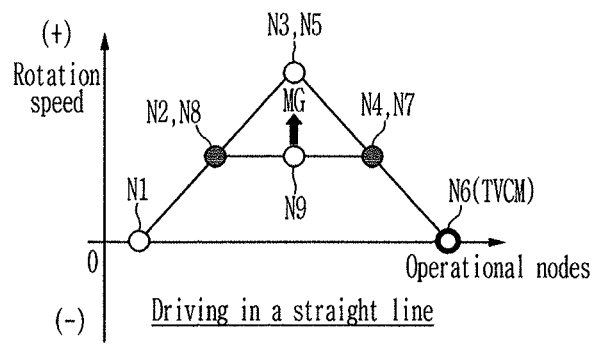
FIG. 2A, FIG. 2B, and FIG. 2C are lever diagrams illustrating torque vectoring operation of the torque vectoring apparatus according to the exemplary embodiment of the present invention.
Figure 2B:
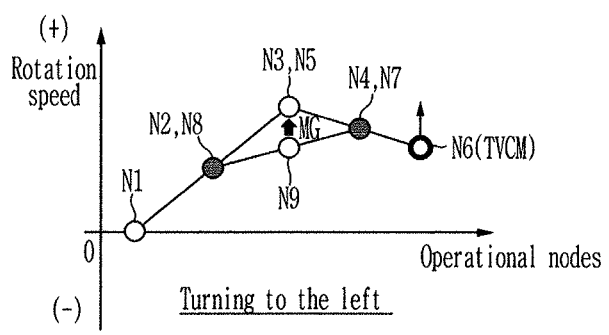
Figure 2C:
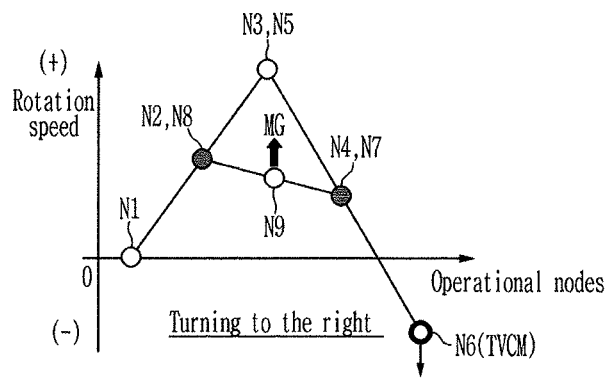

FIG. 2A, FIG. 2B, and FIG. 2C are lever diagrams illustrating torque vectoring operation of the torque vectoring apparatus according to the exemplary embodiment of the present invention.

Referring to FIG. 2A to FIG. 2C, a torque vectoring apparatus according to an exemplary embodiment of the present invention adjusts a torque distribution ratio between the left-side and right-side output shafts OS1 and OS2 by controlling rotation speed and direction of the torque vectoring control motor TVCM, depending on a driving condition such as driving along a straight line, or cornering to the left or right.

In FIG. 2A to FIG. 2C, the vertical axis represents rotation speeds of the three rotation elements N7 to N9 of the fifth planetary gear set PG5 in the differential device 20 and the six rotation elements N1 to N6 of the first and second compound planetary gear sets CPG1 and CPG2 in the torque vectoring device 30. The horizontal axis represents operational nodes of the torque vectoring apparatus.

Operation of the torque vectoring apparatus depending on driving conditions is hereinafter described in detail with reference to FIG. 2.

The first rotation element N1 is fixed to the housing H, and is therefore always stationary. The second rotation element N2 and the eighth rotation element N8 are fixedly interconnected, and therefore always rotate at a same speed. The third rotation element N3 and the fifth rotation element N5 are fixedly interconnected, and therefore always rotate at a same speed.

The sixth rotation element N6 is connected to the torque vectoring control motor TVCM, and thereby the rotation speed and direction of the sixth rotation element N6 are controlled by the torque vectoring control motor TVCM. The ninth rotation element N9 receives a reduced rotation speed of the motor/generator MG through the speed reduction device 10.

[Driving in a Straight Line]

Since the rotation element N1 is stationary, a speed line between the first and second rotation elements N1 and N2 is formed as shown in FIG. 2A, when the ninth rotation element N9 receives a rotation speed from the motor/generator.

In the present situation, the torque vectoring control motor TVCM is also stationary when driving in a straight line. Therefore, a speed line between the sixth and fourth rotation elements N6 and N4 is formed as shown in FIG. 2A, since the sixth rotation element N6 always rotates at the same speed with the second rotation element N2.

Since gear ratios of the first and second compound planetary gear sets CPC1 and CPC2 are symmetrically formed, the third and eighth rotation elements N3 and N8 are formed at a same height in graph (same rotation speed) with the fifth and seventh rotation elements N5 and N7.

Thus, in a straight line, a same torque is applied to the left-side and right-side output shafts OS1 and OS2.

[Cornering to the Left]

As shown in FIG. 2B, cornering to the right of the vehicle is realized while the torque vectoring control motor TVCM rotates in a positive (+) direction thereof.

Since the torque vectoring control motor TVCM rotates in a positive (+) direction thereof, the fourth rotation element N4 also has a positive rotation speed, and therefore the speed line between the sixth and fourth rotation elements N6 and N4 is formed as shown in FIG. 2B.

Consequently, the speed of the fifth and seventh rotation elements N5 and N7 is increased, since the fourth rotation element N4 has a positive rotation speed.

Therefore, the speed of the fifth and seventh rotation elements N5 and N7 becomes greater than the speed of the third and eighth rotation elements N3 and N8, which means that a travel speed of an external wheel becomes greater than a travel speed of an internal wheel in a corner.

That is, a wheel connected to the second output shaft OS2 fixed to the fifth and seventh rotation elements N5 and N7 becomes an external wheel, which means that a vehicle turns to the left.

It is notable that, while turning to the left, the torque vectoring control motor TVCM may be controlled to provide a torque adjusted in the positive direction to enhance cornering agility of a vehicle, which is advantageous in an understeer situation, or may be control to provide a torque adjusted in the negative direction to enhance stability of a vehicle, which is advantageous in an oversteer situation.

That is, a torque vectoring apparatus according to an exemplary embodiment of the present invention may achieve best optimization of cornering agility and stability depending on driving status.

[Cornering to the Right]

As shown in FIG. 2C, cornering to the left of the vehicle is realized while the torque vectoring control motor TVCM rotates in a negative (−) direction thereof.

Since the torque vectoring control motor TVCM rotates in a negative (−) direction thereof, the fourth rotation element N4 also has a negative rotation speed, and therefore the speed line between the sixth and fourth rotation elements N6 and N4 is formed as shown in FIG. 2C.

Consequently, the speed of the fifth and seventh rotation elements N5 and N7 is decreased, since the fourth rotation element N4 has a negative rotation speed.

Therefore, the speed of the fifth and seventh rotation elements N5 and N7 becomes smaller than the speed of the third and eighth rotation elements N3 and N8, which means that a travel speed of an internal wheel becomes smaller than a travel speed of an internal wheel in a corner.

That is, a wheel connected to the second output shaft OS2 fixed to the fifth and seventh rotation elements N5 and N7 becomes an internal wheel, which means that a vehicle turns to the right.

It is notable that, while turning to the right, the torque vectoring control motor TVCM may be controlled to provide a torque adjusted in the negative direction to enhance cornering agility of a vehicle, which is advantageous in an understeer situation, or may be control to provide a torque adjusted in the positive direction to enhance stability of a vehicle, which is advantageous in an oversteer situation.

That is, a torque vectoring apparatus according to an exemplary embodiment of the present invention may achieve best optimization of cornering agility and stability depending on driving status.

When the rotation speed of the motor/generator MG exceed an allowed limit by increasing speed of a vehicle, the synchronizer SL of the speed reduction device 10 may be operated to disconnect torque transmission from and to the motor/generator MG, and thereby a vehicle may be driven without a load to the motor/generator MG.

As described above, a torque vectoring apparatus according to an exemplary embodiment of the present invention is applicable to a high performance environmental vehicle provided with a one-motor e-AWD (all wheel drive), and may achieve both cornering performance and stability of a vehicle depending on driving conditions.

Furthermore, when a vehicle speed becomes excessive to the motor/generator MG, torque transmission from and to the motor/generator MG may be disconnected, reducing undesired power loss and improving fuel consumption.

Such a torque disconnection function may be applicable to a hybrid electric vehicle (HEV), a plug-in hybrid electric vehicle (PHEV), and may be useful in disconnecting torque of a drive motor in the case of running an internal combustion engine.

By employing a torque vectoring control motor TVCM in a torque vectoring device, a torque vectoring function may be optimally controlled, and power loss may be minimized, improving fuel consumption characteristic.

By symmetrically forming two compound planetary gear sets in the torque vectoring device, power loss of a torque vectoring apparatus may be minimized and controllability of the torque vectoring apparatus is maximized, since the torque vectoring control motor TVCM may be merely stationary in a straight line.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A torque vectoring apparatus receiving a vehicle driving torque from a motor/generator, the torque vectoring apparatus comprising:

a speed reduction device coupled to the motor/generator and reducing a rotation speed received from the motor/generator;

a differential device coupled to the speed reduction device and receiving a reduced rotation speed from the speed reduction device and differentially outputting split torques to first-side and second-side output shafts; and a torque vectoring device coupled to the differential device and controlling a torque ratio of the split torques output to the first-side and second-side output shafts coupled to the torque vectoring device, wherein the torque vectoring device includes:

a torque vectoring control motor;

a first compound planetary gear set including:

a first planetary gear set having a first rotation element and a second rotation element; and a second planetary gear set sharing the second rotation element with the first planetary gear set and having a third rotation element, wherein the first rotation element is fixed to a housing and the second rotation element is fixedly connected to a first output shaft among the first-side and second-side output shafts through the differential device; and a second compound planetary gear set including:

a third planetary gear set having a fourth rotation element and a fifth rotation element; and a fourth planetary gear set sharing the fourth rotation element with the third planetary gear set and having a sixth rotation element, wherein the fourth rotation element is fixedly connected to a second output shaft among the first-side and second-side output shafts, the fifth rotation element is fixedly connected to the third rotation element, and the sixth rotation element is gear-engaged with the torque vectoring control motor.

2. The torque vectoring apparatus of claim 1, wherein an output gear formed at a motor shaft of the torque vectoring control motor is gear-engaged with an input gear fixedly connected to the sixth rotation element.

3. The torque vectoring apparatus of claim 1, wherein the torque vectoring control motor is formed as a motor of which rotation speed and rotating direction are controllable.

4. The torque vectoring apparatus of claim 1,
wherein the first rotation element, the second rotation element and the third rotation element of the first compound planetary gear set are formed by a first sun gear of the first planetary gear set, a first common planet carrier shared by the first and second planetary gear sets, and a second ring gear of the second planetary gear set, respectively; and
wherein the fourth rotation element, the fifth rotation element, and the sixth rotation element of the second compound planetary gear set are formed by a second common planet carrier shared by the third and fourth planetary gear sets, a third ring gear of the third planetary gear set, and a fourth sun gear of the fourth planetary gear set, respectively.

5. The torque vectoring apparatus of claim 1,
wherein the differential device includes a fifth planetary gear set having a seventh rotation element, an eighth rotation element, and a ninth rotation element;
wherein the seventh rotation element is fixedly connected to the second output shaft fixedly connected to the fourth rotation element;
wherein the eighth rotation element is fixedly connected to the first output shaft; and
wherein the ninth rotation element receives the reduced rotation speed from the speed reduction device.

6. The torque vectoring apparatus of claim 5, wherein the fifth planetary gear set is a double pinion planetary gear set having a fifth sun gear, a fifth planet carrier, and a fifth ring gear as the seventh rotation element, the eighth rotation element, and the ninth rotation element, respectively.

7. The torque vectoring apparatus of claim 5, wherein the speed reduction device includes:
a drive gear connected to a rotor of the motor/generator;
a driven gear formed on an external circumference of the ninth rotation element of the differential device; and
an idle gear unit coupled to the drive gear and the driven gear and reducing an input speed received from the drive gear and outputting the reduced rotation speed through the driven gear.

8. The torque vectoring apparatus of claim 7, wherein the idle gear unit includes:
an idle shaft mounted external to the differential device and in parallel with the first-side and second-side output shafts;
an idle input gear rotatably mounted on the idle shaft and gear-engaged with the drive gear; and
an idle output gear fixedly formed on the idle shaft and gear-engaged with the driven gear.

9. The torque vectoring apparatus of claim 8, wherein the idle gear unit further including a synchronizer mounted between the idle input gear and the idle shaft, and selectively synchronizing the idle input gear to the idle shaft.

* * * * *